United States Patent
Christensen et al.

(10) Patent No.: US 10,589,243 B2
(45) Date of Patent: Mar. 17, 2020

(54) CATALYTIC REACTOR

(71) Applicant: Haldor Topsøe A/S, Kgs. Lyngby (DK)

(72) Inventors: Anders Lindhard Christensen, Slangerup (DK); Emil Andreas Tjärnehov, Malmö (SE)

(73) Assignee: Haldor Topsoe A/S, Lyngby (DK)

( * ) Notice: Subject to any disclaimer, the term of this patent is extended or adjusted under 35 U.S.C. 154(b) by 129 days.

(21) Appl. No.: 15/735,246

(22) PCT Filed: Jun. 30, 2016

(86) PCT No.: PCT/EP2016/065239
§ 371 (c)(1),
(2) Date: Dec. 11, 2017

(87) PCT Pub. No.: WO2017/009050
PCT Pub. Date: Jan. 19, 2017

(65) Prior Publication Data
US 2018/0161742 A1    Jun. 14, 2018

(30) Foreign Application Priority Data
Jul. 15, 2015   (DK) .................. 2015 00411

(51) Int. Cl.
*B01J 8/02* (2006.01)
*B01J 8/04* (2006.01)
*B01J 8/00* (2006.01)

(52) U.S. Cl.
CPC ............ *B01J 8/0257* (2013.01); *B01J 8/003* (2013.01); *B01J 8/0207* (2013.01); *B01J 8/0214* (2013.01); *B01J 8/0278* (2013.01); *B01J 8/0285* (2013.01); *B01J 8/0292* (2013.01); *B01J 8/0403* (2013.01); *B01J 2208/0015* (2013.01); *B01J 2208/0084* (2013.01); *B01J 2208/00132* (2013.01); *B01J 2208/00159* (2013.01)

(58) Field of Classification Search
CPC .......... B01J 8/0207–0221; B01J 8/0438; B01J 2208/0084; B01J 2208/00884; B01J 2208/00929; B01J 2208/00938; B01J 2208/00159; B01J 2208/0015; B01J 8/0403–0419
See application file for complete search history.

(56) References Cited

U.S. PATENT DOCUMENTS

| | | | | |
|---|---|---|---|---|
| 2,252,719 A | * | 8/1941 | McCausland | B01J 8/0207 34/174 |
| 2,945,807 A | * | 7/1960 | Farnham | B01J 8/0207 208/134 |
| 4,525,482 A | * | 6/1985 | Ohsaki | B01J 8/0207 422/200 |
| 4,714,592 A | * | 12/1987 | Zanma | B01J 8/0285 422/148 |

(Continued)

FOREIGN PATENT DOCUMENTS

| | | | |
|---|---|---|---|
| EP | 2 374 531 A1 | 10/2011 | |
| WO | WO 2014/181079 A1 | 11/2014 | |

*Primary Examiner* — Jennifer A Leung
(74) *Attorney, Agent, or Firm* — Blank Rome LLP

(57) ABSTRACT

The invention relates to a catalytic reactor suited for exothermal reactions with a radial process fluid flow and process fluid flow guides which ensures an extended fluid flow path and higher flow velocity and thereby enhanced cooling of the catalyst bed in the reactor.

8 Claims, 1 Drawing Sheet

(56) References Cited

U.S. PATENT DOCUMENTS

| | | | |
|---|---|---|---|
| 4,769,220 A | 9/1988 | Zardi | |
| 4,778,662 A * | 10/1988 | Pinto | B01J 8/0005 |
| | | | 422/148 |
| 4,976,928 A | 12/1990 | Föster et al. | |
| 5,250,270 A | 10/1993 | Noe | |
| 5,405,586 A | 4/1995 | Koves | |
| 7,022,294 B2 * | 4/2006 | Johnston | B01J 8/0221 |
| | | | 422/198 |

* cited by examiner

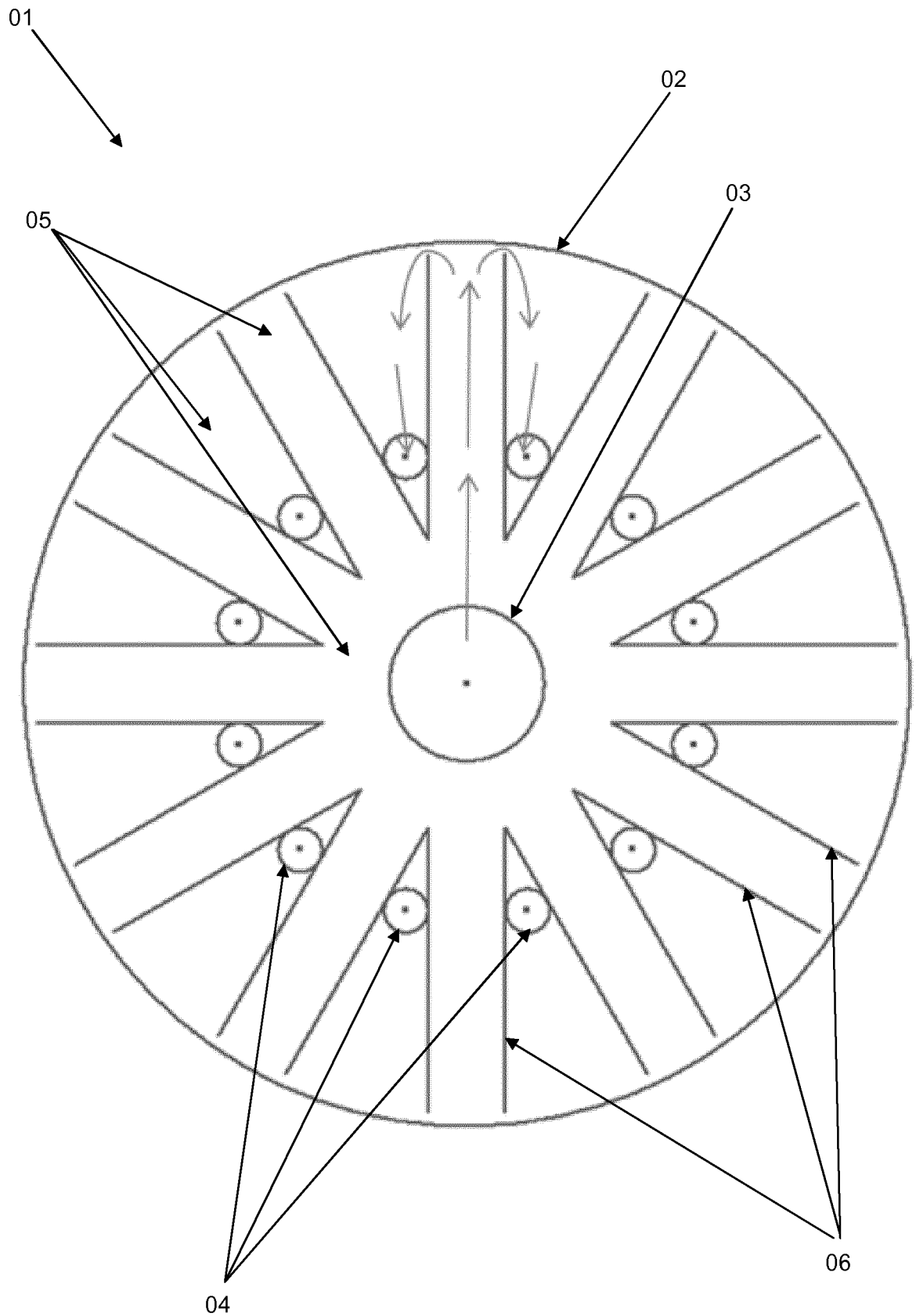

CATALYTIC REACTOR

FIELD OF THE INVENTION

Embodiments of the invention generally relate to a catalytic reactor for an exothermal reaction. More specifically, the invention relates to ensure cooling of a catalyst by increasing the process fluid flow velocity in the catalyst bed of a reactor utilizing the radial flow principle.

BACKGROUND

The most important section of the methanol synthesis process is the methanol reactor. As the synthesis reaction is strongly exothermic, heat removal is an important process. High average heat flux leads to fewer tubes and thus reduced costs.

As the methanol reaction is exothermic, the primary task of the reactor is to control the temperature. The reactor technologies that have been used extensively in commercial settings fall into two categories: multiple catalyst bed reactors and single bed converters.

The multiple catalyst bed reactors control the reaction temperature by separating the catalyst mass into several sections with cooling devices placed between the sections. Bed sizes are generally designed to allow the reaction to go to equilibrium.

The Haldor Topsoe collect, mix, distribute convertor is such a multiple catalyst bed reactor. This reactor has catalyst beds separated by support beams. The gas that is leaving the upstream catalyst is then collected and mixed with a quench gas for cooling. The mixed gas stream is evenly spread over the downstream catalyst bed. The reaction temperature is lowered and the conversion per pass rate is increased.

Another type of multiple catalyst bed reactors are the adiabatic reactors in series. Each catalyst layer is accommodated in a separate reactor vessel with intercoolers between each reactor. The feed gas is fed directly into the first reactor which increases the kinetic driving force for the reaction. This leads to a reduced catalyst volume compared to a quench type reactor.

A further type of multiple catalyst bed reactors are multistage radial flow reactors with intermediate cooling. Indirect cooling keeps the temperature close to the path of the maximum reaction rate curve (when the methanol concentration is plotted against temperature). Maximum, or close to maximum, conversion per pass is then achieved.

Whether the multiple beds are separated by structures and cooling equipment within the reactor or by separate reactors, the above reactors are expensive to construct. As an alternative, single bed reactors may be chosen, where heat is removed continuously from the reactor by transfer to a heat-removing medium. The reactor runs effectively as a heat exchanger.

In one design, a single bed reactor has helically-coiled tubes embedded in the catalyst bed. Compared to reactors with the catalyst inside the tubes, the heat transfer on the catalyst side is significant higher. As a result, material costs are saved since less cooling area is required.

An alternative design for the single bed reactor is much similar to a heat exchanger; it has a vertical shell and tube heat exchanger with fixed tube sheets. The catalyst in the tubes rests on a bed of inert material. Steam is generated by the heat of reaction and drawn off below the upper tube sheet. To achieve precise control of the reaction temperature, steam pressure control is applied. Operating at isothermal conditions enables high yields at low recycles. In addition the amount of by-products is minimized.

Yet a further alternative single bed reactor has double-tubes with catalyst packed between the inner and the outer tubes. The feed enters the inner tubes and is heated when flowing through the tubes. The gas then enters the space between the inner and the outer tubes and flows through the catalyst bed. In addition to being cooled by the gas in the inner tubes, the catalyst is also cooled by boiler water outside the double-tube. Since the catalyst bed temperature is hither near the inlet of the reactor and then lowers towards the outlet, the gas proceeds along the maximum reaction rate line. This means that a higher conversion per pass rate is achieved.

A single bed reactor which reduces the equipment cost is utilizing the redial flow principle. When designing a high capacity methanol converter, there are many potential advantages if the radial flow principle is utilized, especially a very small pressure drop. However if the flow is only limited to be directly from the centre to the outer perimeter (or vice versa) the flow velocity is very slow. This is problematic since it requires cooling tubes distributed very close which is mechanically challenging and expensive. Conventional radial converters tend to face problems with hotspots in the catalyst bed which to some extend can be limited by a higher flow velocity.

Known art offers little solution to this problem, as can be seen in the following references, where:

EP0359952A2 describes a system for the improvement in situ of conventional reactors for the synthesis of methanol. The catalytic mass is divided into several beds in series, each bed having a bottom and a conical diaphragm spaced from the free surface of the next catalytic bed in such a way as to create a space to the outer periphery of which the quench gas is fed so as to achieve in said space the optimum mixing with the partially reacted gas which has run axially through the upper catalytic bed, a tube is introduced below and central to the upper catalytic bed delimiting internally the catalytic mass of the lower beds from the upper bed; and the lower bed or beds with maximum pressure drop are transformed into a bed with a substantially radial flow by introducing two cylindrical walls coaxial with said tube substantially perforated and forming airspaces with the shell inner wall and with the tube outer wall respectively.

WO9964145 discloses methods for constructing packed-bed and monolith reactors/converters, which are more resilient against process disturbances than their conventional counterparts. These stabilized reactors have a reduced tendency to develop, in response to accidental or planned changes of operating parameters, transient hot spots which otherwise can compromise safe and economical reaction operation. The invention involves creating conditions under which transient heat waves that originate from the process disturbances propagate in different radial zones of the reactor with different speeds. As a result, they accumulate phase-shifts relative to each other and interfere destructively through intra-reactor radial heat flows. This constitutes the adaptive mechanism of suppression of the noxious high-temperature waves in exothermal reactors and affects their enhanced operational stability. The area of applicability of stabilized reactors includes chemical and petro-chemical industries as well as automotive (car catalytic converter), environmental (VOC incinerator) and power/heat generation (catalytic combustor) applications. Advantages of the SR are enhanced safety and life span of catalyst and other reactor components, and in production applications—improved throughput, selectivity and product quality.

EP1261419 describes a reactor of the staged adiabatic reactor type, which comprises at least one heat exchanger panel, preferably a printed circuit heat exchange panel, interposes between adiabatic beds of catalyst, wherein the facial area of the panels and the superficial facial area of the corresponding catalyst are substantially similar, and the panels include means defining discrete passages for handling of reactants and heat transfer media, wherein the means defining passages for heat transfer media provide for at least two differing flow path directions for the heat transfer media through the heat exchanger panel whereby the occurrence of temperature bias or differentials is reduced.

US2006171868 discloses a pseudo-isothermal radial chemical reactor for catalytic reactions, comprising a substantially cylindrical shell closed at the opposite ends by respective base plates, comprising a reaction zone in which a respective catalytic bed is supported and a plurality of heat exchangers placed in said reaction zone.

In the following, tubes shall be construed as enclosures of any circumferential shape, only characterized by being longer than the cross sectional distance. Typically tubes are cylindrical, but they may also have non-circular cross sectional shapes and varying cross sectional shape over the tube length.

Process fluid is defined as the process fluid (in any phase or mix of phases, gas, vapor or liquid) which is in the reactor, entering or leaving the reactor and is undergoing a reaction in the reactor. Whereas more specifically reactant is understood as the process fluid which is going to be or is being reacted and the product is the process fluid which has been reacted in the reactor. The limit where the process fluid is a reactant and where it is a product is floating, however when the process fluid is entering the reactor it is defined as being reactant and when it exits the reactor it is defined as being product.

SUMMARY OF THE INVENTION

The invention is different from a traditional radial flow converter in that the flow speed is higher because the flow area is reduced and the flow length is extended. Hereby some of the benefit of the reduced pressure drop is sacrificed to limit the below mentioned problems. Additionally the flow area is controlled and thereby the process fluid velocity through the catalyst.

A major problem which is solved by the invention is the many cooling devices (often tubes) which traditionally are to be fitted in the catalyst bed. A range of effects are achieved:
  Higher heat transfer due to higher flow velocity
  Better flow distribution and thereby less hotspots
  Less manifolding
  Flow velocity and thereby heat transfer can be optimized to fit the conversion rate and optimal temperature.

This is achieved by the invention which is a radial flow catalytic reactor suited for an exothermal reaction in the sense that it has features which enables cooling of the reactor. The reactor has a configuration of process fluid inlet (also referred to as reactant inlet), process fluid outlet (also referred to as product outlet) and flow guides arranged within the reactor which ensures that process fluid flow in the reactor has a flow path which is longer than simply from the centre of the reactor towards the outer reactor shell or from the reactor outer shell towards the centre. Because of this, a higher process fluid flow velocity is ensured, which provides a better heat transfer. The higher heat transfer again allows for a reduction of the number of cooling pipes needed to be arranged within the reactor.

The reactant inlets may be arranged either in the centre of the reactor or outside the centre of the reactor, i.e. as "outer process fluid passages" as referred to in the claims. The product outlets may also be arranged either in the centre of the reactor or outside the centre of the reactor, as "outer process fluid passages". This means that both inlets and outlets can be arranged between the centre of the reactor and the reactor shell or inlets can be arranged between the centre of the reactor and the reactor shell and the outlets can be arranged in the centre of the reactor or outlets can be arranged between the centre of the reactor and the reactor shell while the inlets can be arranged in the centre of the reactor or both inlets and outlets can be arranged in the centre of the reactor. The reactant inlets and the product outlets may be constructed as holes, slits, mesh or screens, which the process fluid passes through. Inlets and outlets are arranged to provide an evenly distributed process fluid flow through the catalyst bed.

Whichever of the above mentioned embodiments are chosen, common for all of them are that fluid flow guides ensure that the process fluid flow cannot pass directly in a straight line from the inlets to the outlets. Instead, the fluid flow guides forces the process fluid to pass in an extended flow path, which has the consequence that the flow velocity is increased, all other parameters being equal. When the flow velocity is increased, so is the heat transfer between the process flow and objects which is in its contact. Hence the number of cooling tubes which is necessary to cool the exothermic reaction in the reactor can be decreased while maintaining the same cooling effect.

The position of the inlets and outlets and the arrangement of the fluid flow guides may be arranged as best fit to lower costs, material dimensions or effect. In one embodiment, the process fluid flow path is from the centre of the reactor, towards the reactor shell, performing a turn and then in a direction towards the centre of the reactor again, when seen in a cross sectional plane of the reactor. Hence, the flow path is approximately double the length as if it ran as well known in the art of radial flow reactors, from the reactor centre towards the reactor shell only. This flow path can for instance be achieved when inlets and outlets are placed near or in the centre of the reactor and the fluid flow guides are stretching out from the centre of the reactor towards and nearly in contact with the reactor shell, thereby forcing the process fluid to flow around the guide when passing from inlets to outlets.

In another embodiment of the invention, the process fluid flow path is from an area near the reactor shell, towards the centre of the reactor, performing a turn and then flowing towards the reactor shell again. Also in this embodiment, the flow path as compared to a traditional radial flow reactor is approximately double the length. This embodiment can be achieved when inlets and outlets are arranged in the outer area near the reactor shell and the fluid flow guides reaches from the reactor shell and inwards near to the centre of the reactor, thereby forcing the process fluid flow to flow around the flow guide when flowing from inlets to outlets.

In a further embodiment, the process fluid flow path may perform more than two radial flow paths. This can be achieved by arranging the fluid flow guides in a labyrinth arrangement, whereby the process fluid flow is forced to perform a number of radial flow paths between the centre of the reactor and the reactor shell.

As explained above, the higher flow velocity allows for a reduction in the number of cooling tubes. In strongly exothermal reactions there is a need for a considerable amount of cooling tubes. As these are reduced, the tube sheets need not be as thick to ensure strength, since they are not perforated to the same amount. Production and assembling of the internals is off course also radically simplified when the number of cooling tubes is reduced, as is the manifolding needed for connecting all the tubes to cooling media inlet(s) and outlet(s). The higher flow velocity and the flow path control ensured by the fluid flow guides provide a better flow distribution throughout the entire cross sectional area of the reactor. This reduces the risk of hotspots in the cat bed which is a commonly known problem when using known art radial flow reactors for exothermal reactions.

The cooling tubes may be arranged co-axial with the reactor, in patterns resembling concentric circles when seen in a cross sectional view. This ensures a very effective heat transfer, but can have the challenge that tube sheet strength is adversely affected. Another option is to distribute the cooling tubes evenly throughout the cross sectional are of the reactor, this leaves the tube sheets less challenged with regard to weakening because the tube sheet perforations for holding the tubes are evenly distributed correspondingly. The evenly distributed cooling tubes have however not as high a heat transfer as the above mentioned cooling tube distribution.

In an embodiment of the invention, the fluid flow guides may act as not only flow guides, but also cooling tubes or panels. This may be achieved in a variety of ways. Cooling tubes may be arranged close together in lines, which act as walls serving to both guide and cool the process fluid. The fluid flow guides may also be made of double plate material, leaving a void within the guides for the flowing of cooling fluid as known from heat exchangers. This embodiment has the advantage that much less manifolding is required, since one cooling fluid inlet and outlet is able to cover a large cooling area in the catalyst bed of the reactor as compared to one cooling tube. In this embodiment, the fluid flow guides acting also as cooling plates, may be supplemented by cooling tubes as well; the number of the cooling tubes may however be correspondingly reduced.

FEATURES OF THE INVENTION

1. A catalytic reactor for an exothermal reaction with a radial process fluid flow, said reactor comprising,
    a reactor shell having a reactor shell volume arranged to hold at least one catalyst bed,
    a centre process fluid passage arranged within the reactor shell,
    at least one reactant inlet and at least one product outlet,
    wherein said reactor further comprises at least one process fluid flow guide adapted to guide the process fluid flow from the at least one reactant inlet in a flow path with a direction outwards relative to the centre axis of the reactor towards the reactor shell and from the reactor shell in a direction inwards relative to the centre axis of the reactor towards the at least one product outlet, or in a flow path with a direction inwards relative to the centre axis of the reactor and then in a direction outwards relative to the centre axis of the reactor towards the towards the reactor shell and the at least one product outlet when seen in a cross sectional plane of the reactor.
2. A catalytic reactor according to feature 1, further comprising at least one outer process fluid passage, wherein the centre process fluid passage comprises a plurality of reactant inlets and the at least one outer process fluid passage comprises a plurality of product outlets, whereby the process fluid flows in a radial plane in the reactor through the at least one catalyst bed from the reactant inlets, guided around the at least one process fluid flow guide to the product outlets.
3. A catalytic reactor according to feature 1, further comprising at least one outer process fluid passage, wherein the at least one outer process fluid passage comprises a plurality of reactant inlets and the centre process fluid passage comprises a plurality of product outlets, whereby the process fluid flows in a radial plane in the reactor through the at least one catalyst bed from the reactant inlets, guided around the at least one process fluid flow guide to the product outlets.
4. A catalytic reactor according to any of the preceding features, wherein the reactor has a circular cross section and the at least one outer process fluid passage is arranged radially around the centre process fluid passage.
5. A catalytic reactor according to any of the preceding features, wherein at least one process fluid flow guide is arranged around a part of each outer process fluid passage, restricting the process fluid to flow from the at least one reactant inlet and around the flow guide before it can flow to the at least one product outlet.
6. A catalytic reactor according to any of the preceding features, wherein the at least one process fluid flow guide is U-shaped or V-shaped in a cross sectional view of the reactor, and each of the at least one process fluid flow guide has an outer process fluid passage arranged within the V-shape or U-shape.
7. A catalytic reactor according to any of the preceding features, wherein one process fluid flow guide is fixed to each of the at least one outer process fluid passages.
8. A catalytic reactor according to feature 1, wherein said centre process fluid passage is divided into a reactant passage comprising said at least one reactant inlet adapted to provide reactant fluid to the at least one catalyst bed and a product passage comprising said at least one product outlet adapted to exit product fluid from the at least one catalyst bed.
9. A catalytic reactor according to feature 1 further comprising a plurality of outer process fluid passages, wherein at least one of said outer process fluid passages comprises a plurality of reactant inlets and at least one other outer process fluid passage comprises a plurality of product outlets, whereby the process fluid flows through the at least one catalyst bed from the reactant inlets in a flow path with a direction inwards relative to the centre axis of the reactor guided around the at least one process fluid flow guide and then in a direction outwards relative to the centre axis of the reactor towards the reactor shell and exit through the plurality of product outlets when seen in a cross sectional plane of the reactor.
10. A catalytic reactor according to any of the preceding features, wherein the at least one reactant inlets and the at least one product outlets are formed as holes, slots, mesh or screens.
11. A catalytic reactor according to any of the preceding features, wherein the reactor further comprises cooling tubes.
12. A catalytic reactor according to any of the preceding features, wherein at least one of said process fluid flow guides is adapted to provide cooling for the catalyst bed.
13. A catalytic reactor according to feature 12, wherein at least one of said process fluid flow guides is at least one cooling tube, a plurality of cooling tubes fixed together, at least one heat exchange plate or at least one cooling plate adapted to provide a cooling media within the at least one fluid flow guide.

14. A catalytic reactor according to any of the preceding features, wherein the reactor is a methanol converter.

15. A catalytic reactor according to any of the preceding features, wherein the centre process fluid passage has a diameter of 200 mm to 1500 mm.

16. Use of a reactor according to any of the preceding features for methanol synthesis.

BRIEF DESCRIPTION OF THE DRAWING

Embodiments of the present invention are explained, by way of example, and with reference to the accompanying drawing. It is to be noted that the appended drawing illustrates only an example of an embodiment of this invention and therefore is not to be considered limiting of its scope, for the invention may admit to other equally effective embodiments.

FIG. 1 shows a part cut view of the cross sectional area of the internals of a reactor according to an embodiment of the invention.

POSITION NUMBERS

01. Catalytic reactor
02. Reactor shell
03. Centre process fluid tube
04. Outer process fluid tube
05. Catalyst bed
06. Process fluid flow guide

DETAILED DESCRIPTION OF THE DRAWING

Turning to FIG. 1 a cut of the cross section of a catalytic reactor 01 is seen, where the outer circumference is the reactor shell 02. Within the shell, a catalyst bed 05 is contained. In this embodiment, a centre process fluid tube 03 is providing process fluid to the catalyst bed via reactant inlets such as apertures, for instance holes or slots (not shown) in the centre process fluid tube. Outer process fluid tubes 04 provide product outlets (not shown). In other embodiment the number of process fluid tubes may be different and the flow may be in the opposite direction.

To increase the flow path of the process fluid in the catalyst bed and control the flow area, process fluid flow guides 06 are arranged within the catalytic reactor. In the embodiment shown, the process fluid flow guides are v-shaped and arranged around each of the outer process fluid tubes, thereby preventing the process fluid to flow in the direct shortest line from the centre process fluid tube to each of the outer process fluid tubes. Instead, the process fluid is forced to flow all the way from the centre process fluid tube, radially out towards the reactor shell, and then after a U-turn in the flow direction back radially inwards in the reactor to each of the outer process fluid tubes.

Hence, the flow path of the process fluid is increased and thus also the flow velocity. The area covered by the process fluid from reactant inlets to product outlets is by far larger than in conventional catalytic reactors of the same type. Since the process fluid serves as cooling media for the exothermic catalytic reaction in the reactor, the cooling effect is increased and the necessity for cooling tubes is reduces or, as in this embodiment, avoided.

Parameters may be varied according to an actual process. The number of outer and centre process fluid tubes may be varied, the number of process fluid flow guides may be varied, the distance of the outer process fluid tubes from the centre may be varied, the shape of the process fluid flow guides may be varied and the distance of the outer edge of the process fluid flow guides from the reactor shell may be varied and optimized.

The invention claimed is:

1. A catalytic reactor for an exothermal reaction with a radial process fluid flow, said reactor comprising,
a reactor shell having a reactor shell volume arranged to hold at least one catalyst bed,
a center process fluid passage and at least one outer process fluid passage, both arranged within the reactor shell,
at least one reactant inlet and at least one product outlet,
wherein said reactor further comprises:
at least one process fluid flow guide adapted to guide the process fluid flow from each reactant inlet in a flow path with a direction radially outwards relative to the center axis of the reactor towards the reactor shell and from the reactor shell in a direction radially inwards relative to the center axis of the reactor towards each product outlet, and
wherein the center process fluid passage comprises each reactant inlet or each product outlet, and, respectively, each outer process fluid passage comprises each product outlet or each reactant inlet, whereby the process fluid flows in a radial plane in the reactor through each catalyst bed from each reactant inlet, guided around each process fluid flow guide to each product outlet,
wherein each process fluid flow guide has a U-shape or a V-shape in a cross sectional view of the reactor, and each outer process fluid passage is arranged within the V-shape or U-shape of each process fluid flow guide, thereby requiring the process fluid to flow from each reactant inlet and around the ends of the V-shape or U-shape of each process fluid flow guide before the process fluid can flow to each product outlet, and
wherein each process fluid flow guide is adapted to provide cooling for each catalyst bed.

2. The catalytic reactor according to claim 1, wherein the reactor has a circular cross section and each outer process fluid passage is arranged radially around the center process fluid passage.

3. The catalytic reactor according to claim 1, wherein each process fluid flow guide is fixed to each outer process fluid passage.

4. The catalytic reactor according to claim 1, wherein each reactant inlet and each reactant each product outlet are formed as holes, slots, mesh or screens.

5. The catalytic reactor according to claim 1, wherein the reactor further comprises cooling tubes.

6. The catalytic reactor according to claim 1, wherein each process fluid flow guide is at least one cooling tube, a plurality of cooling tubes fixed together, at least one heat exchange plate or at least one cooling plate adapted to provide a cooling media within each process fluid flow guide.

7. The catalytic reactor according to claim 1, wherein the reactor is a methanol converter.

8. The catalytic reactor according to claim 1, wherein the center process fluid passage has a diameter of 200 mm to 1500 mm.

* * * * *